June 7, 1955 P. M. DOOLIN 2,710,031
SAW MARKER FOR FLOORING STRIPS
Filed May 8, 1953 2 Sheets-Sheet 1
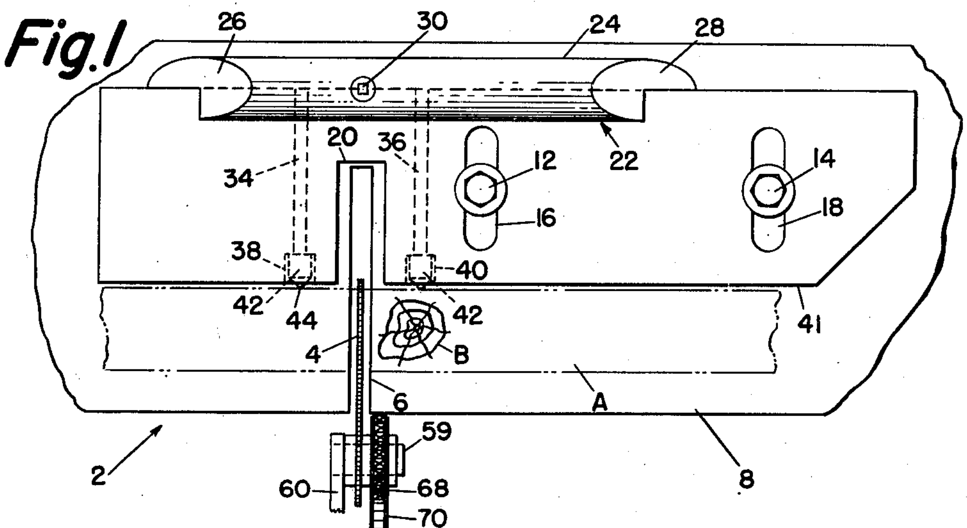
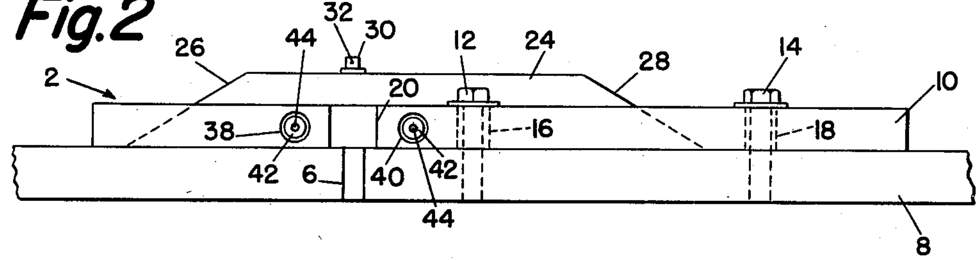
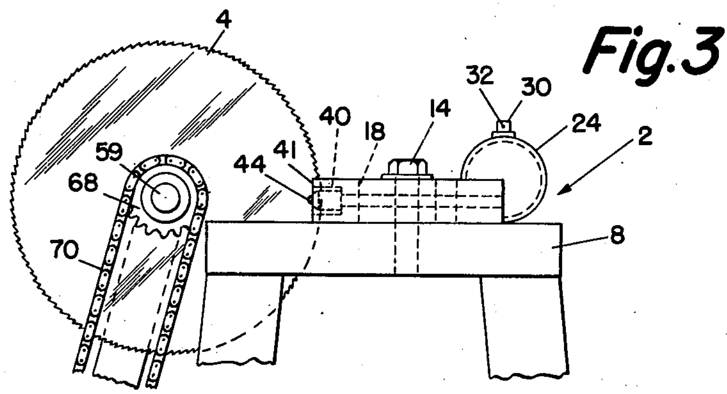
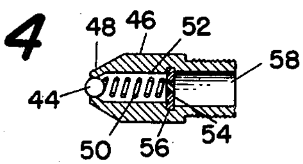
INVENTOR.
PAUL M. DOOLIN
BY Busser Smith & Harding
ATTORNEYS June 7, 1955 P. M. DOOLIN 2,710,031
SAW MARKER FOR FLOORING STRIPS
Filed May 8, 1953 2 Sheets-Sheet 2
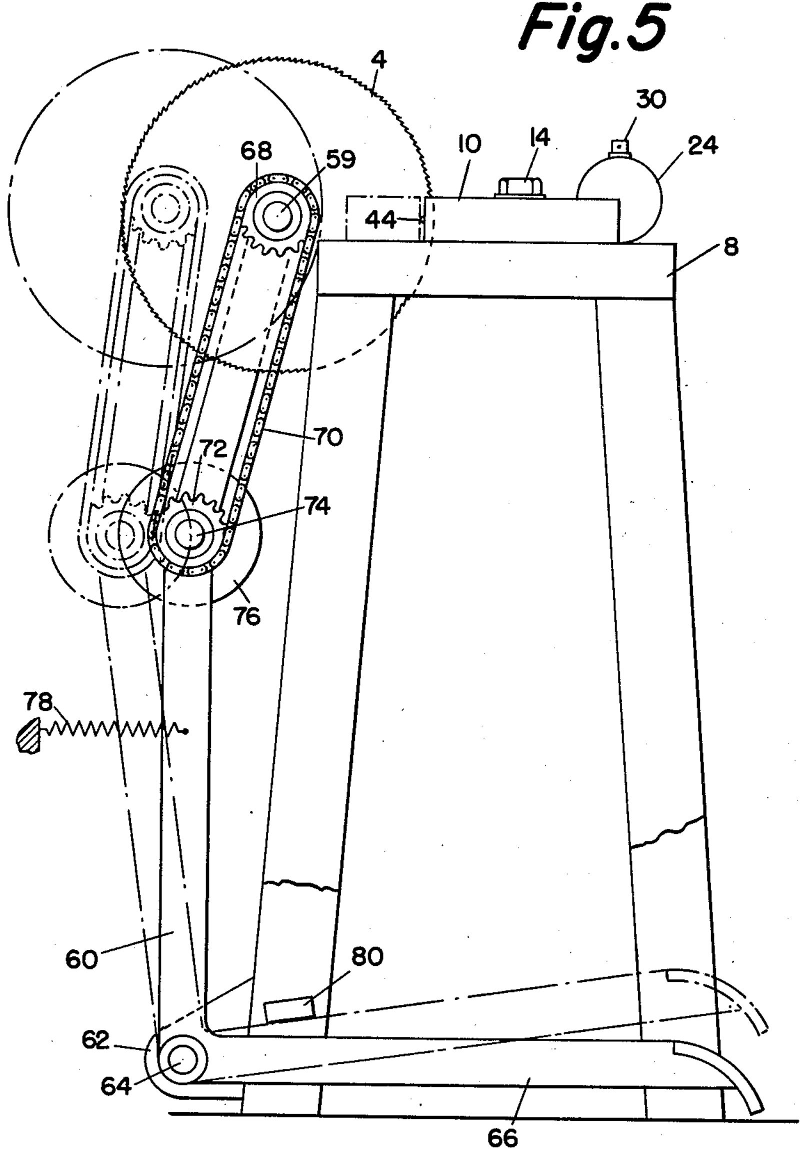
INVENTOR.
PAUL M. DOOLIN
BY Busser Smith & Harding
ATTORNEYS

United States Patent Office 2,710,031

Patented June 7, 1955

2,710,031

SAW MARKER FOR FLOORING STRIPS

Paul M. Doolin, North Little Rock, Ark., assignor to E. L. Bruce Company, Memphis, Tenn., a corporation of Delaware

Application May 8, 1953, Serial No. 353,841

4 Claims. (Cl. 144—3)

This invention relates to a saw marker and, more particularly, relates to a device adapted to mark with ink, or the like, an unmilled flooring strip as it is being sawn.

The structure in accordance with this invention has particular utility when used in connection with a saw utilized to cut knots out of lengths of flooring strips. The device in accordance with this invention marks the defective portion of the wood cut out by the saw operator. By using different colored marking inks, or the like, the work of each saw operator can be given an identifying mark. This permits the subsequent surveying of the defective pieces and the ready identification of the saw operators who do excellent work and of the operators whose work is not up to the acceptable standard.

The broad object of this invention is, therefore, to provide means for placing an identifying marking on wood, or the like, after it has been sawed.

It is a further object of this invention to provide an identifying marking on defective pieces of wood as they are removed by sawing from the usable portions.

These and other objects of this invention will become apparent on reading the description in conjunction with the drawings, in which:

Figure 1 is a plan view of a saw marker in accordance with this invention.

Figure 2 is a rear elevation of the saw marker of Figure 1 with the saw not shown.

Figure 3 is an end view of the saw marker of Figure 1.

Figure 4 is a vertical section of an applicator.

Figure 5 is an end view of the saw marker of Figure 1 and shows the saw mechanism.

As shown in Figures 1 through 3, a saw marker 2 has a rotary saw 4, which is adapted to pass through an opening 6 in a saw table 8. A stop 10 is bolted to table 8 by means of bolts 12 and 14 which pass through slots 16 and 18, respectively, in stop 10. Stop 10 has a cut-out portion 20 to accommodate the saw 4.

Reservoir 22 is provided at the rear of stop 10. Reservoir 22 is formed by welding an appropriately cut section of pipe 24 to stop 10. The ends of pipe 24 are sealed by members 26 and 28, respectively. A filling plug 30 is threadably secured in the top of reservoir 22 and is provided with breather holes 32. The reservoir will be filled with any conventional marking fluid, such as printing ink with a varnish base.

Stop 10 is provided with drilled passageways 34 and 36 leading forwardly from reservoir 22 and connecting with recesses 38 and 40, respectively, in stop face 41 of stop 10.

Recesses 38 and 40 each contain an applicator 42 threadably secured, respectively, in passageways 34 and 36 with only the ball 44 of each applicator 42 projecting forwardly beyond face 41 of stop 10.

Each applicator 42 has a body portion 46 provided with a seat 48 for ball 44. A compression coil spring 50 supports ball 44 and is secured in passageway 52 by a split ring 54 in recess 56. It will be noted that the outside radius of spring 50 is smaller than the radius of passageway 52. Adjacent ring 54 is a bore 58. When ink is placed in reservoir 22, it flows through passageways 34 and 36 and passes through bore 58, ring 54 and into passageway 52 of each applicator 42, respectively.

As shown in Figure 5, the rotary saw 4 is carried by a shaft 59 mounted for rotation in rocking frame 60 which is pivotally secured to a frame 62 at 64. Frame 60 has a forwardly extending portion 66 which is positioned so that the operator, located at the front of the stop 10, can step on it to rotate the frame causing the saw to move forwardly and engage a flooring strip A.

A sprocket 68 is secured to shaft 59 and carries a chain 70 which in turn is carried by sprocket 72. Sprocket 72 is secured to shaft 74 which is driven by an electric motor shown on frame 60 at 76. A spring 78 biases frame 60 in a direction to move it against stop 80.

In operating the above described structure, a flooring strip A containing an undesirable knot B is placed on table 8 against stop 10. Downward pressure on portion 66 of frame 60 rotates frame 60 and causes saw 4 to advance and cut through flooring strip A. As the saw forces strip A against stop 10, the strip contacts balls 44 of applicators 42, pushing the balls 44 inwardly and permitting a small amount of ink to flow about balls 44 and onto wood A. As viewed in Figure 1, the right-hand applicator 42 will mark the portion of the strip A which is cut out. When a cut is made on the other side of knob B, the left-hand applicator will also mark the cut-out portion. It will be appreciated that the location of applicators 42 insures marking the cut-out portion even when the fault being removed is at one end of the flooring strip.

It will be appreciated that the above description is merely by way of illustration and that it is not desired to be limited except as set forth in the following claims.

What is claimed is:

1. In combination, a saw marker which comprises a stop member having a stop face and an opening to receive a saw, an ink applicator adjacent said opening and recessed in the stop face of the stop member, said ink applicator having a spring biased ball adapted to block its discharge opening, said ball projecting beyond the stop face of said stop member, ink reservoir means to supply said ink applicator, a saw and means to advance said saw towards said stop member and retract it from said stop member.

2. In combination, a saw marker which comprises a stop member having a stop face and an opening to receive a saw, ink applicators adjacent each side of said opening and recessed in the stop face of the stop member, said ink applicators each having a spring biased ball adapted to block its discharge opening, said ball projecting beyond the stop face of said stop member, ink reservoir means to supply said ink applicators, a saw and means to advance said saw towards said stop member and retract it from said stop member.

3. In combination, a saw marker which comprises a stop member having a stop face and an opening to receive a rotary saw, an ink applicator adjacent said opening and recessed in the stop face of the stop member, said ink applicator having a spring biased ball adapted to block its discharge opening, said ball projecting beyond the stop face of said stop member, ink reservoir means to supply said ink applicator, a rotary saw and means to advance said rotary saw towards said stop member nd retract it from said stop member.

4. In combination, a saw marker which comprises a stop member having a stop face and an opening to receive a rotary saw, ink applicators adjacent each side of said opening and recessed in the stop face of the stop member, said ink applicators each having a spring biased ball adapted to block its discharge opening, said ball projecting beyond the stop face of said stop member, ink reservoir means to supply said ink applicators, a rotary saw and means to advance said rotary saw towards said stop member and retract it from said stop member.

References Cited in the file of this patent

UNITED STATES PATENTS

| | | |
|---|---|---|
| 1,288,082 | McDonough | Dec. 17, 1918 |
| 1,364,356 | De Koning | Jan. 4, 1921 |
| 1,547,896 | Brown | July 28, 1925 |
| 1,610,623 | Shipley | Dec. 14, 1926 |
| 1,690,111 | Heston | Nov. 6, 1928 |
| 2,505,958 | Grierson | May 2, 1950 |
| 2,533,704 | Zanetti | Dec. 12, 1950 |